United States Patent
Coakley

(10) Patent No.: US 11,781,772 B2
(45) Date of Patent: Oct. 10, 2023

(54) AIR CONDITIONING SYSTEM, SERVER SYSTEM, NETWORK, METHOD FOR CONTROLLING AIR CONDITIONING SYSTEM AND METHOD FOR CONTROLLING NETWORK WITH SELF-TUNING FOR OPTIMAL CONFIGURATION OF THE AIR CONDITIONING SYSTEM

(71) Applicant: Mitsubishi Electric Corporation, Chiyoda-ku (JP)

(72) Inventor: Daniel Coakley, Livingston (GB)

(73) Assignee: Mitsubishi Electric Corporation, Chiyoda-ku (JP)

( * ) Notice: Subject to any disclaimer, the term of this patent is extended or adjusted under 35 U.S.C. 154(b) by 165 days.

(21) Appl. No.: 16/823,769

(22) Filed: Mar. 19, 2020

(65) Prior Publication Data
US 2020/0309399 A1    Oct. 1, 2020

(30) Foreign Application Priority Data

Mar. 29, 2019    (EP) .................................... 19166125

(51) Int. Cl.
| | | |
|---|---|---|
| F24F 11/64 | (2018.01) | |
| F24F 11/58 | (2018.01) | |
| F24F 11/46 | (2018.01) | |
| H04W 4/33 | (2018.01) | |
| F24F 140/60 | (2018.01) | |
| F24F 130/10 | (2018.01) | |

(52) U.S. Cl.
CPC .............. *F24F 11/58* (2018.01); *F24F 11/46* (2018.01); *F24F 11/64* (2018.01); *H04W 4/33* (2018.02); *F24F 2130/10* (2018.01); *F24F 2140/60* (2018.01)

(58) Field of Classification Search
CPC . F24F 11/30; F24F 11/64; F24F 11/32; G05B 2219/2614; G05B 2219/2642; G05B 19/048; G05B 23/024
See application file for complete search history.

(56) References Cited

U.S. PATENT DOCUMENTS

| | | | | |
|---|---|---|---|---|
| 5,195,329 A | * | 3/1993 | Lewis | .................. F25B 49/022 62/201 |
| 6,700,214 B2 | * | 3/2004 | Ulinski | ............. H02M 3/33584 322/17 |

(Continued)

FOREIGN PATENT DOCUMENTS

| | | |
|---|---|---|
| CN | 106524439 A | 3/2017 |
| EP | 2 363 658 A | 9/2011 |

(Continued)

OTHER PUBLICATIONS

Combined Chinese Office Action and Search Report dated Apr. 19, 2021 in Chinese Patent Application No. 2020102107102 (with English translation), citing document AO therein, 26 pages.

(Continued)

*Primary Examiner* — Darrin D Dunn
(74) *Attorney, Agent, or Firm* — Oblon, McClelland, Maier & Neustadt, L.L.P.

(57) ABSTRACT

The present disclosure refers to an air conditioning system, a server system, a network as well as a method for controlling an air conditioning system and a method for controlling a network.

13 Claims, 1 Drawing Sheet

(56) References Cited

U.S. PATENT DOCUMENTS

| | | | |
|---|---|---|---|
| 8,473,108 B2* | 6/2013 | Mizuno | H05K 7/20836 |
| | | | 700/277 |
| 8,655,492 B2* | 2/2014 | Wakuta | F24F 11/30 |
| | | | 700/278 |
| 9,546,794 B1* | 1/2017 | Carson | G05D 27/02 |
| 10,234,158 B2* | 3/2019 | Laughman | F24F 11/62 |
| 10,330,335 B2* | 6/2019 | Vallikannu | F24F 11/30 |
| 10,372,146 B2* | 8/2019 | Vitullo | F24F 11/63 |
| 10,648,684 B2* | 5/2020 | Ito | F24F 11/48 |
| 10,724,752 B2* | 7/2020 | Dyess | F24F 11/56 |
| 10,779,159 B2* | 9/2020 | Hurst | G06F 11/0742 |
| 10,868,744 B2* | 12/2020 | Kondo | H04L 41/065 |
| 10,996,270 B1* | 5/2021 | Chillarige | G01R 31/3177 |
| 11,054,342 B2* | 7/2021 | Courtney | G05D 9/12 |
| 11,073,850 B2* | 7/2021 | Gillette | G05D 23/1934 |
| 11,098,919 B2* | 8/2021 | Nabeshima | F24F 11/70 |
| 11,126,490 B2* | 9/2021 | Davelman | G06N 3/08 |
| 11,449,839 B2* | 9/2022 | McKelvy | G06N 3/0454 |
| 2001/0048376 A1* | 12/2001 | Maeda | F24F 11/30 |
| | | | 340/870.17 |
| 2004/0011066 A1* | 1/2004 | Sugihara | F24F 11/30 |
| | | | 62/177 |
| 2005/0038567 A1* | 2/2005 | Maeda | F24F 11/30 |
| | | | 700/276 |
| 2007/0179635 A1* | 8/2007 | Bailey | G06F 11/006 |
| | | | 700/21 |
| 2008/0099570 A1* | 5/2008 | Krebs | F23N 5/203 |
| | | | 236/46 R |
| 2008/0243434 A1* | 10/2008 | Boutin | B65B 57/00 |
| | | | 702/179 |
| 2010/0106309 A1 | 4/2010 | Grohman et al. | |
| 2010/0268397 A1* | 10/2010 | Whitehurst | F24F 11/30 |
| | | | 62/157 |
| 2011/0093121 A1* | 4/2011 | Wakuta | F24F 11/30 |
| | | | 700/291 |
| 2011/0210178 A1 | 9/2011 | Murai et al. | |
| 2012/0116595 A1* | 5/2012 | Mizuno | H05K 7/20836 |
| | | | 700/277 |
| 2012/0216555 A1* | 8/2012 | Ishii | G05D 23/1902 |
| | | | 62/126 |
| 2013/0085613 A1* | 4/2013 | Bester | F24F 11/62 |
| | | | 700/277 |
| 2013/0151019 A1* | 6/2013 | Federspiel | G05D 23/1934 |
| | | | 700/276 |
| 2013/0190940 A1 | 7/2013 | Sloop et al. | |
| 2013/0289775 A1 | 10/2013 | Murai et al. | |
| 2014/0316583 A1* | 10/2014 | Ambriz | F24F 11/30 |
| | | | 700/277 |
| 2014/0346237 A1 | 11/2014 | Mirza et al. | |
| 2015/0057810 A1* | 2/2015 | Smith | F24F 11/30 |
| | | | 700/276 |
| 2015/0161573 A1* | 6/2015 | Uchida | G06Q 50/10 |
| | | | 705/305 |
| 2015/0178421 A1* | 6/2015 | Borrelli | G06F 30/13 |
| | | | 703/7 |
| 2015/0250076 A1* | 9/2015 | Kondo | H05K 7/20836 |
| | | | 361/679.48 |
| 2015/0300672 A1* | 10/2015 | Fadell | G05B 15/02 |
| | | | 700/278 |
| 2015/0370271 A1* | 12/2015 | Raghunathan | F24F 11/30 |
| | | | 700/277 |
| 2016/0018125 A1* | 1/2016 | Hamstra | F24F 11/62 |
| | | | 703/7 |
| 2016/0105019 A1* | 4/2016 | Mukai | F24F 11/30 |
| | | | 361/93.9 |
| 2016/0109147 A1* | 4/2016 | Uno | F24F 11/62 |
| | | | 700/276 |
| 2016/0116179 A1* | 4/2016 | Land, III | F24F 11/62 |
| | | | 700/276 |
| 2016/0138822 A1* | 5/2016 | Steinberg | G05B 15/02 |
| | | | 700/278 |
| 2016/0146480 A1* | 5/2016 | Ito | F24F 11/62 |
| | | | 62/93 |
| 2016/0154417 A1 | 6/2016 | Sloop | |
| 2016/0377309 A1* | 12/2016 | Abiprojo | F24F 11/30 |
| | | | 700/276 |
| 2017/0028886 A1* | 2/2017 | Zhang | B60N 2/5657 |
| 2017/0292728 A1* | 10/2017 | Ushirosako | F24F 11/30 |
| 2017/0336091 A1* | 11/2017 | Arensmeier | F24F 11/30 |
| 2018/0130031 A1* | 5/2018 | Arensmeier | G06Q 10/20 |
| 2018/0156505 A1* | 6/2018 | Pham | F25B 41/00 |
| 2018/0238772 A1* | 8/2018 | Courtney | F04D 15/0218 |
| 2018/0283722 A1* | 10/2018 | Jung | G05B 15/02 |
| 2018/0313564 A1 | 11/2018 | Gavin et al. | |
| 2019/0024928 A1 | 1/2019 | Li et al. | |
| 2019/0086110 A1* | 3/2019 | Okita | G05D 23/1917 |
| 2019/0107306 A1* | 4/2019 | Chang | G01F 1/00 |
| 2019/0212026 A1* | 7/2019 | Kim | F24F 11/61 |
| 2020/0033018 A1* | 1/2020 | Nabeshima | F24F 1/14 |
| 2020/0080742 A1* | 3/2020 | Okamoto | F24F 1/32 |
| 2020/0100394 A1* | 3/2020 | Albinger | H05K 7/20718 |
| 2020/0284458 A1* | 9/2020 | Yoshida | F24F 11/86 |
| 2020/0355390 A1* | 11/2020 | Chen | F24F 11/58 |
| 2020/0386428 A1* | 12/2020 | Matthys | G05B 15/02 |
| 2021/0003308 A1* | 1/2021 | Venne | F24F 11/62 |
| 2021/0048209 A1* | 2/2021 | Xiong | F24F 11/30 |
| 2021/0264385 A1* | 8/2021 | McKelvy | G06N 3/08 |
| 2021/0310679 A1* | 10/2021 | Toyama | F24F 11/38 |
| 2022/0003447 A1* | 1/2022 | Williams | F24F 11/46 |
| 2022/0178569 A1* | 6/2022 | Fujimoto | G05B 19/042 |

FOREIGN PATENT DOCUMENTS

| | | |
|---|---|---|
| JP | 2001-280674 A | 10/2001 |
| JP | 2003-83589 A | 3/2003 |
| JP | 2011-247514 A | 12/2011 |
| JP | 2012-167884 A | 9/2012 |
| WO | WO 2017/056403 A1 | 4/2017 |

OTHER PUBLICATIONS

Notice of Reasons for Refusal dated Jan. 10, 2023 in Japanese Patent Application No. 2020-054436 (with English language translation), citing documents 15-19 therein, 15 pages.

European Search Report dated Sep. 11, 2019 in European Application 19166125.5 filed Mar. 29, 2019, 8 pages.

\* cited by examiner

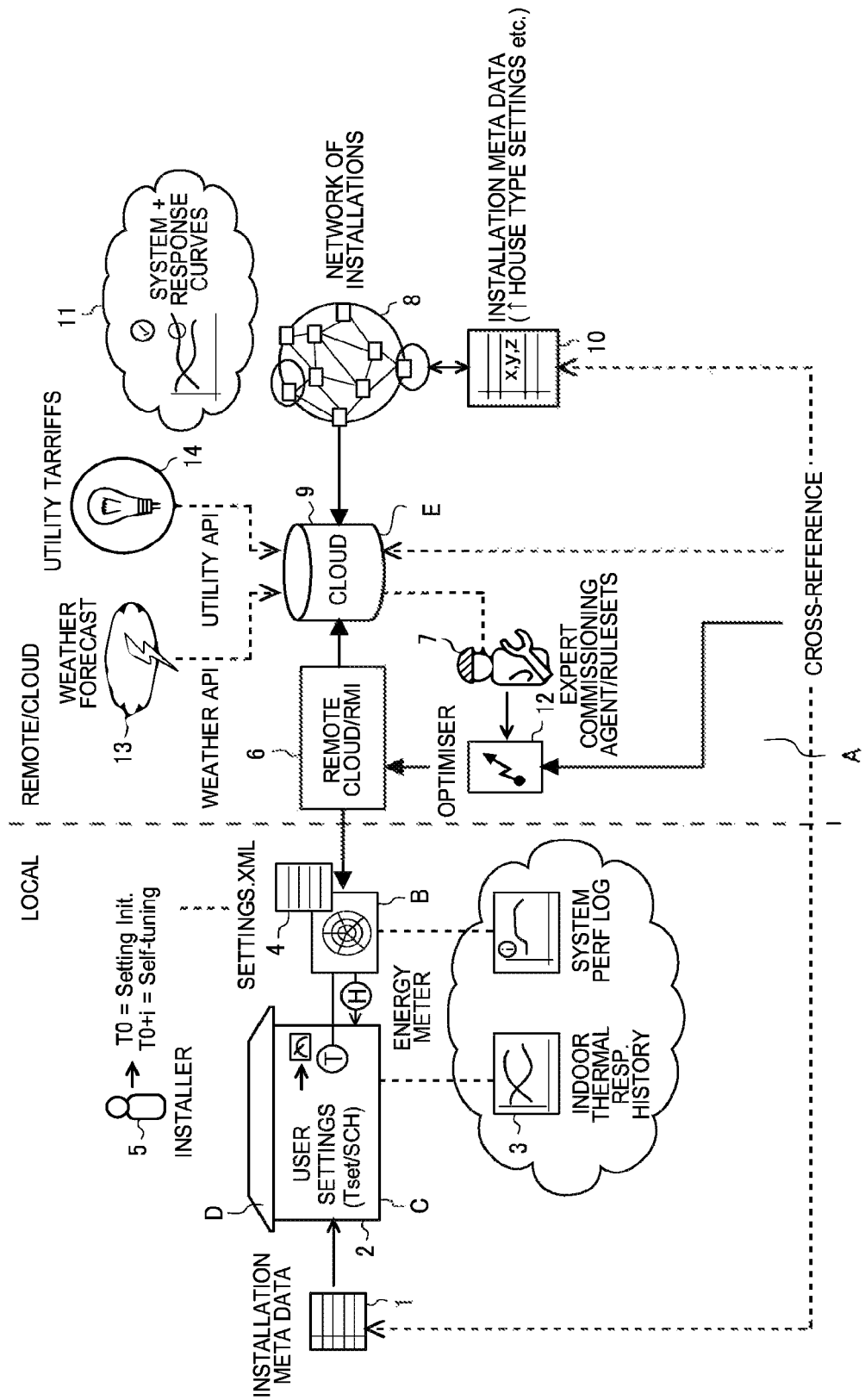

AIR CONDITIONING SYSTEM, SERVER SYSTEM, NETWORK, METHOD FOR CONTROLLING AIR CONDITIONING SYSTEM AND METHOD FOR CONTROLLING NETWORK WITH SELF-TUNING FOR OPTIMAL CONFIGURATION OF THE AIR CONDITIONING SYSTEM

FIELD OF THE INVENTION

The present disclosure refers to an air conditioning system, a server system, a network as well as a method for controlling an air conditioning system and a method for controlling a network.

BACKGROUND OF THE INVENTION

In particular as an example for the claimed air conditioning system the present disclosure relates to the control of an individual operational unit, for example an individual heat pump forming part of an air conditioning system or a building heating system. Current state of air conditioning systems rely with respect to their efficient use to a large extent on manual commissioning performed by expert installers, which are knowledgeable about appropriate configurations of the air conditioning system to be configured within the respective building, wherein the air conditioning system is installed. Such settings for system parameters are usually supplied in a commissioning check list, which is filled by the expert upon installation and commissioning of an air conditioning system.

Therefore the overall performance of the air conditioning system depends heavily on the expertise of the commissioning agent/installer, which can vary significantly. Furthermore, this manual one time commissioning of an air conditioning system may lead to deterioration over time, when changes occur in the air conditioning system dynamics, for example changes in the emitter size/type, change of space used, number and/or activity of occupants etc.

Furthermore actual monitored performance of heat pumps post commissioning often varies significantly from theoretical performance. This may be due at least partially to a variety of factors including inappropriate system sizing, balancing and control configuration, as well as general system faults. This results in inefficient system operation, which may often go undetected and/or lead to thermal discomfort for occupants.

SUMMARY OF THE INVENTION

The present disclosure therefore intends to overcome the above mentioned problems and provides an air conditioning system, which has a more efficient system operation, less thermal discomfort for occupants and is further adapted to changes in the system environment.

Further it is the object of the present disclosure to provide a server system comprising such an air conditioning system, a network comprising such an air conditioning system, as well as methods for controlling an air conditioning system or a network having the above mentioned advantages.

This problem is solved by the air conditioning system including at least one operational unit, at least one controller for controlling of the operational units according to installation data of the operational units, and communication means configured to be connected to a network and to ex-change data between the controller and the network for the air conditioning system to become part of the network, in which the air conditioning system is configured to send and receive data related to installation and/or performance parameters of the at least one operational unit and/or the air conditioning system to and from the network and to control, by the controller, the operational units according to the received data, the server system being configured to be connected to at least two air conditioning systems, in which the server system is configured to receive data from at least one of the connected air conditioning systems, possibly via controllers in the air conditioning systems, receive data related to installation and/or performance parameters of at least one operational unit at least of the first air conditioning system, and possibly further air conditioning system(s), determine for the at least one of the operational units of at least the first air conditioning system at least one modified operational parameter, and send the modified operational parameter at least to the first air conditioning system for controlling at least the operational unit of the first air conditioning system, the network including such an air conditioning system and server system, the method for controlling an air conditioning system including sending, data related to installation and/or performance parameters of the at least one operational unit and/or the air conditioning system to a network, receiving, data related to installation and/or performance parameters of at least one operational unit at least of the first air conditioning system and/or of at least the first air conditioning system from the network, and controlling, by the controller, of the first air conditioning system at least the operational unit of the first air conditioning system according to the received data, and the method for controlling a network including sending, at least by of the first air conditioning system, data related to installation and/or performance parameters of at least one operational unit at least of the first air conditioning system and/or of the air conditioning system to the server system, receiving, by the server system, said data related to installation and/or performance parameters of the at least one operational unit at least of the first air conditioning system, and possibly further air conditioning system(s) determining, by the server system, at least for the at least one of the operational units of the first air conditioning unit at least one modified operational parameter, sending, by the server system, the modified operational parameter to the first air conditioning system for controlling at least the operational unit of the first air conditioning system, receiving, by the first air conditioning system, said data sent by the server system, and controlling, by the controller of the first air conditioning system at least the operational unit of the first air conditioning system according to the received data.

According to the present disclosure, an inventive air conditioning system for conditioning the air of e.g. a building, comprises; at least one operational unit, at least one controller for controlling the operational unit according to installation data of the operational unit, and a communication means configured to be connected to a network and to exchange data between the controller and the network, the communication means allowing the air conditioning system to become a part of said network.

According to the present disclosure the air conditioning system is configured to send and receive data related to installation and/or performance parameters of the at least one operational unit and/or the air conditioning system to and from the network and to control, by the controller, the operational unit according to the received data.

Given the current availability of real time and historic log data regarding a system operation of air conditioning systems as well as availability of information regarding a network of such systems, usually in the so-called "cloud", the air conditioning system according to the present disclosure is proposed, which is able to automate self-tuning of its system control settings over time. Thus, it is one of the concepts of the present disclosure to use data, e.g. stored in a network, like aggregated network operational data in contextual meta-data (e. g. house type, emitter type, etc.) in order to infer an optimal configuration in individual installations for the inventive air conditioning system and control its operational units according to these optimal configurations. The optimal configuration may, for example, be determined by statistical analysis of network stored data to derive improvements from data of similar air conditioning system installations. It further allows an ongoing re-tuning of the air conditioning system over time based on detected changes in the system operating dynamics, like for example changes in room size, room access or room use by inhabitants of a building etc.

The corresponding methods for controlling an air conditioning system for example utilizes a historic performance log of this and/or further air conditioning systems to derive characteristics pertaining to its particular installation, e. g. thermal response of the building and heat emitters, in combination with information in a server system ("Cloud based information") pertaining to the performance of similar air conditioning system installations in order to adjust the air conditioning system operational settings, e. g. flow temperature, frequency of compressor etc. By this control method overall performance, for example coefficient of performance (COP) or occupant comfort as defined by predictive mean vote (PMV), can be improved over time without further installation effort by a person/expert.

In order to optimize the system settings further, prediction data for a range of optional parameters, for example weather forecast, forecast on number of occupants, preferred temperature settings etc., may be included in the control. Re-tuning of the system settings may be performed on a repeated, e.g. periodical, basis to allow for further improved performance. Further predictive data may relate to and/or be derived from predictive models such as occupant behaviour models, building energy simulation models, etc.

According to the air conditioning system according to the disclosure this air conditioning system comprises communication means for the air conditioning system to become a part of a network.

A network thereby may be a local area network, a wide area network, the internet or basically any kind of cloud database. However, the term "network" here is also used to designate any other kind of data storage medium and a processor connected to the air conditioning system, whether it being inside or outside of the housing of the air conditioning system.

Also any combination of local data storage, data acquisition or data processing with data storage, data acquisition and data processing on a long range network like the internet may be used and be designated as "network" without departing from the present disclosure.

Generally the installation parameters in the present disclosure may comprise building characteristics of the building to be air conditioned by an air conditioning system, like a dwelling type (single family home, apartment housing) thermal mass of building and/or emitter type of building, further control settings of any of the operational units in the air conditioning system like a zone temperature set point, set back period indoor scheduling, further also using inputs like zone temperature set point, comfort flexibility and/or scheduling, further data including prediction data like a past/current or forecast weather, energy pricing, energy consumption peak events, renewable's availability or storage availability, further information on the operational state of the at least one operational unit, e. g. pumps, valves, compressors etc., for example as acquired by a sensor and further installation and/or commissioning data like fluid flow parameters (flow amount, flow speed and/or temperature, fluid return temperature whether a compensation occurs etc.

The aforementioned information on the operational state of at least one of the operational units in an inventive air conditioning system and the aforementioned installation and/or commissioning data may also be the target of control as control settings.

As mentioned before, the air conditioning system disclosed herein is configured to send and receive data related to installation and/or performance parameters of the at least one operational unit of the air conditioning system and/or of the air conditioning system itself to and from a network and control its operational units according to received data from the network.

Thus, the network is also a target of the present disclosure, wherein the network comprises at least one of the inventive air conditioning systems as mentioned before. Further the network comprises a server system, wherein the server system as such may also be the target of the present disclosure. Such a server system may comprise one or more servers and according to the disclosure is configured to be connected to at least two air conditioning systems. One of these air conditioning systems is an inventive conditioning system, which is able to send and receive data from the server system for control of its operational units, while the other air conditioning system may be configured like an inventive air conditioning system or differently, e.g. may only be enabled to send but not to receive data to/from the server system The inventive server system on the side of the network may receive data related to installation and/or performance parameters of at least one of the operational units of the air conditioning system according to the present disclosure and possibly from further air conditioning systems, whether they are according to the air conditioning system or not and whether they are able to receive data from the server system or not.

The server system further may determine for said air conditioning system according to the disclosure for at least one of its operational units at least one modified operational parameter and sends the modified operational parameter to the air conditioning system for controlling said operational unit. Modification of the operational parameters may be done on a regular or irregular basis depending on the needs to change the operation of the operational unit. However, there may be also long periods, where no change of the operational parameters is necessary although the inventive server system still keeps receiving said data and determining operational parameters for the air conditioning system.

In particular the server system may determine the at least one modified operational parameter based on an analysis which comprises at least one of the following types of analysis.
a) Comparison or statistical analysis of installation data and operational and/or performance data of at least one air conditioning system.
b) Comparison or statistical analysis of at least two different operational and/or performance data of at least one air conditioning system, wherein the difference may be the in-acquisition time and/or in the air conditioning system.

c) Determination or statistical analysis of usage parameters, for example past/current/expected number of occupants in the building to be air conditioned, preferred temperature settings of occupants etc. By the inventive server system performance parameters of controlled air conditioning systems can be improved and re-tuned over time and according to a change in conditions and environment of said air conditioning system.

The present disclosure also comprises a network comprising the above mentioned inventive server system as well as at least one inventive air conditioning system.

The present disclosure further comprises a method for controlling an air conditioning system according to the disclosure and a method for controlling a network according to the disclosure as already described above.

BRIEF DESCRIPTION OF THE DRAWINGS

FIG. 1 is a diagram showing a network A according to the disclosure including server system E according to the disclosure and air conditioning systems B,C according to the disclosure.

DETAILED DESCRIPTION

In the following an example for an inventive air conditioning system is described in relation to the enclosed FIGURE.

FIG. 1 describes a network A according to the disclosure including server system E according to the disclosure and air conditioning systems B,C according to the disclosure.

In FIG. 1 the following reference signs are used for entities used therein as shown in the following table:

| Item Refsign | Brief Description Entity |
|---|---|
| A | Network |
| B | Outdoor unit |
| C | Indoor unit |
| D | Building |
| E | Cloud network |
| T, H | Communication lines |
| | Local/Operational performance data/metadata |
| 1 | Installation meta-data (e.g. location, climate, emitter type, floor area, house type, constructions etc.) |
| 2 | User Settings (Zone temperature set-point, operation schedule etc.) |
| 3 | Local operational data (e.g. temperature profile, instantaneous COP, SPF etc.) |
| 4 | System configuration parameters (e.g. flow/return temperature, weather compensation curve etc.) |
| 5 | Expert installer - initialization of system configuration parameters |
| | Cloud/Remote |
| 6 | Local <-> Cloud communication interface (Hardware + Software) |
| 7 | Expert commissioning agent/defined rulesets for ideal initialization & re-tuning of system configuration parameters |
| 8 | Global network of heat pump installations |
| 9 | Database of time-series operational performance data 3 and associated static meta-data 1 |
| 10 | Remote/cloud instance of local installation meta-data/settings 1 and 2 |
| 11 | Remote/cloud instance of local operational data 3 |
| 12 | Optimizer algorithm utilizing statistical analysis of aggregate data 10 and 11 |
| 13 | Weather prediction data |
| 14 | Utility/Grid connection (i.e. for Smart Grid/Demand response) |

On the left side of FIG. 1, designated by "local" an air conditioning system in a network A according to the present disclosure is shown. The network A comprises an air conditioning system with an outdoor unit B and an indoor unit C in a building G, which are connected via two communication lines T and H. The air conditioning system B, C comprises operational units like pumps, valves and compressors in the outdoor unit B as well as in the indoor unit C, which are operated according to commissioned settings.

For commissioning at the time of installation an expert/installer 5 will adapt the settings according to an initial point of time $T_0$ as is shown by the numbers 4 and 5 in FIG. 1. For further self-tuning of the air conditioning system B, C a number of parameters is determined like installation meta-data 1, indoor thermal response history 3 and system performance log, wherein the latter three parameters are stored in the "cloud" network E. Using these parameters the air conditioning system B, C or servers in the cloud network E determine optimized parameters for operation of the operational units of the air conditioning system B, C. Using these optimized parameters the air conditioning system B, C is constantly or periodically or with no period but over time re-tuned and thereby its operation is improved.

In FIG. 1 network A further comprises a number of additional air conditioning systems (designated as "network of installations" 8). These installations also provide system performance logs, indoor thermal response history data and system response curves 11 to the network server in cloud network E. The network server then among others takes weather forecast data 13, utility tariffs 14 (costs of energy), installation meta-data 10 and parameters 11 of network 8 of air conditioning system installations into account and determines optimized operational parameters to be sent to the air conditioning system B, C via remote connection 6 for changing its setting and operating in an improved state.

Of course the present disclosure further allows intervention by an expert 7, who at any time at initial commissioning or later retuning may interfere with the optimizing unit 12, which calculates improved operational parameters of the inventive air conditioning system B, C.

In the foregoing air conditioning systems are described. Such air conditioning systems may not only be systems of cooling type or heating type or mixed cooling/heating type. They may be or may include as one of their operational units in particular heat pumps (air to air, air to water, water to water, ground source and any other kind of heat pump).

The operational units may be pumps, valves, compressors and any other operational unit of the air conditioning system.

Building characteristics may include the type (e. g. detached house, brick construction, roof type, isolation type and dimensioning) and can also include a location/location type (e.g. South England, Northern Europe, Southern Europe; city, countryside etc.).

Control settings can be among others flow temperature of a refrigerant/heating medium, compressor frequency etc.

The invention claimed is:

1. An air conditioning system for conditioning the air of a building comprising:
   at least one operational unit,
   at least one controller for controlling of the at least one operational unit according to installation data of the at least one operational unit, and
   a communication line configured to be connected to a network and to exchange data between the controller and the network for the air conditioning system to become part of the network, the network comprising a plurality of air conditioning systems,
   wherein the air conditioning system is a first air conditioning system of the plurality of air conditioning systems,
   wherein the controller is configured to
      send and receive data related to installation and/or performance parameters of the at least one operational unit and/or the first air conditioning system to and from the network,
      receive a modified operational parameter of the at least one operational unit from the network, the modified operational parameter being processed in order to modify an operational parameter of the first air conditioning system and being based on a difference in at least two different installation and/or performance parameters of the plurality of air conditioning systems and the first air conditioning system, and a statistical analysis of the installation and/or performance parameters of the plurality of air conditioning systems, the difference being in the first air conditioning system, and
      control the at least one operational unit according to the received modified operational parameter,
   wherein the data related to installation parameters includes at least one of the group comprising:
      building characteristics of the building to be air conditioned,
      control settings of the at least one operational unit,
      user inputs,
      prediction data,
      information on the operational state of the at least one operational unit, and
      installation and/or commissioning data, and
   wherein the control setting of the at least one operational unit includes at least one of flow amount, flow speed, flow temperature, fluid return temperature, weather compensation curve, valve opening degree, pump power, and compressor frequency.

2. The air conditioning system according to claim 1, wherein the at least one operational unit includes one or more of pumps, valves, and/or compressors.

3. The air conditioning system according to claim 1, wherein the data related to performance parameters include at least one of a performance indicator.

4. The air conditioning system according to claim 1, wherein the building characteristics include at least one of building type, construction parameters, building size, building position, building location, building orientation, and type of building surrounding.

5. The air conditioning system according to claim 1, wherein the network is a local network and all air conditioning systems connected to and comprised in the local network being of a same type or identical.

6. The air conditioning system according to claim 1, wherein the plurality of air conditioning systems of the network are connected via a network server or a cluster of network servers and all air conditioning systems connected to and comprised in the network being of a same type or identical.

7. The air conditioning system according to claim 1, wherein the first air conditioning system is at least one of a heating system, a cooling system, and a ventilation system installed in a building.

8. A server system being configured to be connected to a plurality of air conditioning systems, wherein a first air conditioning system of the plurality of air conditioning systems is an air conditioning system according to claim 1,
   wherein the server system is configured to
      receive data from at least one of the connected air conditioning systems via controllers in the air conditioning systems,
      receive data related to installation and/or performance parameters of at least one operational unit at least of the first air conditioning system,
      determine for the at least one operational unit of the first air conditioning system at least one modified operational parameter based on a difference in at least two different installation and/or performance parameters of the plurality of air conditioning systems and the first air conditioning system, and a statistical analysis of the installation and/or performance parameters of the plurality of air conditioning systems, the difference being in the first air conditioning system, and
      send the modified operational parameter to the first air conditioning system for controlling the at least one operational unit of the first air conditioning system.

9. The server system according to claim 8, wherein the determining at least one modified operational parameter of an operational unit of an air conditioning system is based on at least one of
   a) a comparison or statistical analysis of installation data and operational and/or performance data of at least one air conditioning system,
   b) a comparison or statistical analysis of at least two different operational and/or performance data of at least one air conditioning system,
   c) determination or statistical analysis of usage parameters, and
   d) determination or statistical analysis of past and/or current and/or forecast weather conditions.

10. The server system according to claim 8, wherein the determining at least one modified operational parameter of an operational unit of an air conditioning system is processed in order to optimize a performance parameter of the air conditioning system.

11. A network comprising
   a plurality of air conditioning systems, a first air conditioning system of the plurality of air conditioning systems is an air conditioning system according to claim 1, and
   a server system connected to the plurality of air conditioning systems, the server system configured to
      receive data from at least one of the connected air conditioning systems via controllers in the air conditioning systems,
      receive data related to installation and/or performance parameters of at least one operational unit at least of the first air conditioning system,
      determine for the at least one operational unit of the first air conditioning system a modified operational parameter, and send the modified operational parameter to the first air conditioning system for controlling the at least one operational unit of the first air conditioning system.

12. A method for controlling an air conditioning system according to claim 1 comprising:
    sending, data related to installation and/or performance parameters of the at least one operational unit and/or the air conditioning system to a network,
    receiving, data related to the installation and/or performance parameters of the at least one operational unit of the first air conditioning system, and
    controlling, by the controller, of the first air conditioning system at least the operational unit of the first air conditioning system according to the received data.

13. A method for controlling a network according to claim 11 comprising:
    sending, at least by of the first air conditioning system, data related to installation and/or performance parameters of at least one operational unit of the first air conditioning system,
    receiving, by the server system, said data related to installation and/or performance parameters of the at least one operational unit of the first air conditioning system,
    determining, by the server system, for the at least one operational unit of the first air conditioning unit at least one modified operational parameter,
    sending, by the server system, the at least one modified operational parameter to the first air conditioning system for controlling the at least one operational unit of the first air conditioning system,
    receiving, by the first air conditioning system, said data sent by the server system, and
    controlling, by the controller of the first air conditioning system the at least one operational unit of the first air conditioning system according to the received data.

* * * * *